United States Patent
Nair et al.

(10) Patent No.: US 10,171,993 B2
(45) Date of Patent: Jan. 1, 2019

(54) IDENTITY REQUEST CONTROL FOR USER EQUIPMENT

(71) Applicants: Alcatel-Lucent USA Inc., Murray Hill, NJ (US); Nokia Technologies OY, Espoo (FI)

(72) Inventors: Suresh P. Nair, Whippany, NJ (US); Anja Jerichow, Grafing (DE)

(73) Assignees: NOKIA TECHNOLOGIES OY, Espoo (FI); NOKIA OF AMERICA CORPORATION, Murray Hill, NJ (US)

(*) Notice: Subject to any disclaimer, the term of this patent is extended or adjusted under 35 U.S.C. 154(b) by 0 days.

(21) Appl. No.: 15/588,039

(22) Filed: May 5, 2017

(65) Prior Publication Data
US 2018/0324583 A1    Nov. 8, 2018

(51) Int. Cl.
| | | |
|---|---|---|
| H04W 12/02 | (2009.01) | |
| H04W 64/00 | (2009.01) | |
| H04W 48/14 | (2009.01) | |
| H04W 76/11 | (2018.01) | |
| H04W 88/02 | (2009.01) | |

(52) U.S. Cl.
CPC ........... *H04W 12/02* (2013.01); *H04W 48/14* (2013.01); *H04W 64/00* (2013.01); *H04W 76/11* (2018.02); *H04W 88/02* (2013.01)

(58) Field of Classification Search
CPC .................................................. H04W 12/02
USPC ........................................................ 455/411
See application file for complete search history.

(56) References Cited

U.S. PATENT DOCUMENTS

| | | | | |
|---|---|---|---|---|
| 5,907,804 A | * | 5/1999 | Schroderus | G07F 7/1008 340/5.6 |
| 8,412,229 B1 | * | 4/2013 | Bonn | H04W 4/003 370/310 |
| 2016/0277926 A1 | * | 9/2016 | Molina | H04L 63/1458 |
| 2016/0278147 A1 | * | 9/2016 | Adrangi | H04W 4/005 |

OTHER PUBLICATIONS

3GPP, "3rd Generation Partnership Project; Technical Specification Group Services and System Aspects; System Architecture for the 5G System; Stage 2 (Release 15)," 3GPP TS 23.501 V0.4.0, Apr. 2017, 124 pages.
3GPP, "3rd Generation Partnership Project; Technical Specification Group Services and System Aspects; Study on the Security Aspects of the Next Generation System (Release 14)," 3GPP TR 33.899 V1.1.0, Mar. 2017, 491 pages.
3GPP, 3rd Generation Partnership Project; Technical Specification Group Services and System Aspects; Study on Security Aspects for LTE Support of V2X Services (Release 14), 3GPP TR 33.885 V1.1.0, Feb. 2017, 86 pages.

* cited by examiner

*Primary Examiner* — Joel Ajayi
(74) *Attorney, Agent, or Firm* — Ryan, Mason & Lewis, LLP (57) ABSTRACT

Techniques are provided for protecting the privacy of user equipment during identity request operations in a communication system. In one example, a method includes receiving a current identity request at given user equipment of a communication system. The method further includes making a determination at the given user equipment whether or not to respond to the current identity request in a manner requested based on a count of previous identity requests received by the given user equipment.

20 Claims, 5 Drawing Sheets

IDENTITY REQUEST CONTROL FOR USER EQUIPMENT

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services intended to provide improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network or an eNB (evolved Node B) in an LTE network. The access point (e.g., gNB/eNB) is illustratively part of an access network of the communication system. For example, in a 5G network, the access network is referred to as a 5G System and is described in 5G Technical Specification (TS) 23.501, V0.4.0, entitled "Technical Specification Group Services and System Aspects; System Architecture for the 5G System," the disclosure of which is incorporated by reference herein in its entirety. In an LTE network, the access network is an Evolved Universal Terrestrial Radio Access Network (E-UTRAN). In general, the access point (e.g., gNB/eNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks.

SUMMARY

Illustrative embodiments provide techniques for providing user equipment with identity response decision control during identity request operations in a communication system.

In one embodiment, a method comprises receiving a current identity request at given user equipment of a communication system. The method further comprises making a determination at the given user equipment whether or not to respond to the current identity request in a manner requested based on a count of previous identity requests received by the given user equipment.

Advantageously, in an illustrative embodiment, the determination comprises comparing the count of previous identity requests received by the given user equipment to a permissible number of identity requests to which the given user equipment can respond. Then, the given user equipment is permitted to respond to the current identity request when the comparison indicates that the count is below the permissible number. Otherwise, the given user equipment is prevented from responding to the current identity request in a manner requested when the comparison indicates that the count is at or above the permissible number.

While these techniques can be applied to various communication networks, they are particularly suitable for 5G and next generation communication networks.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for managing identity requests to user equipment in a manner which protects the privacy of the user equipment identity. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC) and a 3GPP next generation system (5G), the disclosed embodiments can be adapted in a straightforward manner to a variety of other types of communication systems including, but not limited to, WiMAX systems and Wi-Fi systems.

Further, while illustrative embodiments described herein are particularly well suited for implementation in an LTE-V2X system or its 5G evolution eV2X, alternative embodiments are not limited to implementation in such a system. The LTE-V2X system, which is described in 3GPP Technical Report (TR) 33.885, V1.1.0, entitled "Technical Specification Group Services and System Aspects; Study on security aspects for LTE support of V2X services," the disclosure of which is incorporated by reference herein in its entirety. The LTE-V2X system is designed to provide transport of V2X communications (vehicle-to-everything communications including, for example, vehicle-to-vehicle, vehicle-to-infrastructure, vehicle-to-network, and vehicle-to-pedestrian communications) in order to allow vehicle/road safety applications and other services such as, for example, traveler information dissemination, to be implemented. Privacy is required such that V2X UE identities cannot be correlated. However, it is to be understood that embodiments described herein are not intended to be limited to LTE-V2X, eV2X. or any specific LTE or 5G service or architecture.

Figure 1:
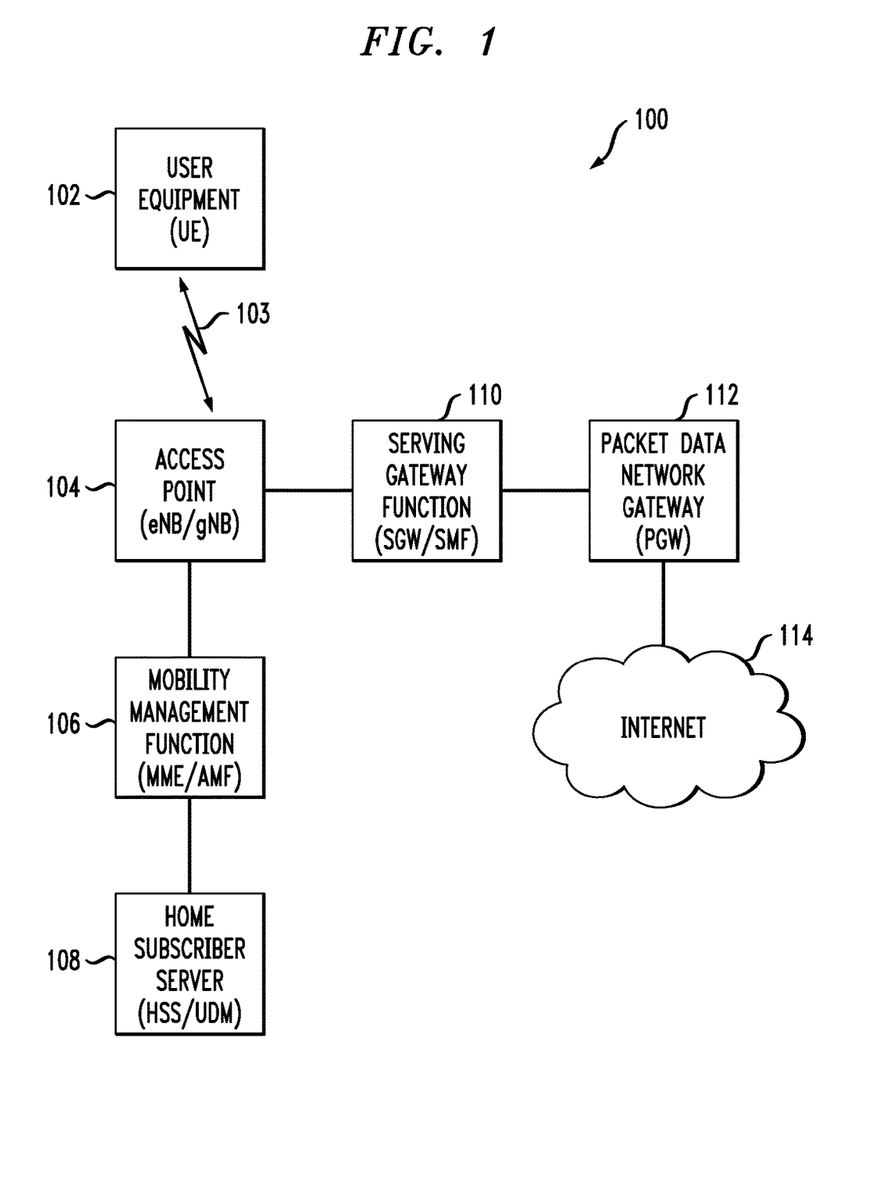
FIG. 1 is a block diagram of a communication system in an illustrative embodiment.

FIG. 1 shows a communication system 100 within which illustrative embodiments are implemented. It is to be understood that the elements shown in communication system 100 are intended to represent main functions provided within the system, e.g., UE access functions, mobility management functions, serving gateway functions, etc. As such, the block shown in FIG. 1 references specific elements in LTE and 5G networks that provide the main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented.

Accordingly, as shown, communication system 100 comprises user equipment (UE) 102 that communicates via an air interface 103 with an access point (eNB/gNB) 104. The UE 102 may be a mobile station, and such a mobile station may comprise, by way of example, a mobile telephone, a computer, or any other type of communication device. In an LTE-V2X implementation, one or more UEs may be deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., vehicle). Such communication devices are also intended to encompass devices commonly referred to as access terminals.

In one embodiment, UE 102 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, an E-UTRAN or 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to a mobility management function 106. In an LTE network, the function is typically implemented by a Mobility Management Element (MME), while in a 5G network, the function is implemented by an Access and Mobility Management Function (AMF). Although not expressly shown, the security anchor functionality (SEAF) can be implemented with the AMF connecting a UE with the mobility management. A mobility management function, as used herein, is the element or function in the CN part of the communication system that performs, among other network operations, identity request operations with the UE (through the access point 104). The MME/AMF 106 in this illustrative embodiment is operatively coupled to a Home Subscriber Server (HSS) 108. HSS, called UDM (User Data Management) in a 5G network, may also comprise an Authentication and Security Function (AUSF) and an Authentication Credential Repository and Processing Function (ARPF) as part of the UDM function.

The access point 104 is also operatively coupled to a serving gateway function 110 (e.g., Serving Gateway (SGW) in an LTE network, and Session Management Function (SMF) in a 5G network), which is operatively coupled to a Packet Data Network (PDN) Gateway (PGW) 112. PGW 112 is operatively coupled to a Packet Data Network, e.g., Internet 114. HSS/UDM 108 is considered part of the home network of UE 102, while MME/AMF 106 is considered part of a CN. MME/AMF 106 can also be part of a serving network. Further typical operations and functions of such network elements are not described here since they are not the focus of the illustrative embodiments and may be found in appropriate 3GPP LTE or 5G documentation.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB/gNB, MME/AMF, HSS/UDM, SGW/SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service (e.g., V2X service), and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via eNB/gNB 104.

With respect to 5G systems, the above-referenced 3GPP TR 33.899 document identifies subscription (UE) privacy as one of the most important security areas to be addressed. Several solutions are proposed which can be generally divided into two categories: pseudonym solutions; and public key cryptography solutions. Both aim to protect the subscription identifier over the air.

The pseudonym solutions provide "pseudonymity" for UE 102 which is the condition when the processing of personally identifiable information (PII) is such the data can no longer be attributed to a specific subscriber without the use of additional information, as long as such additional information is kept separately and subject to technical and organizational measures to ensure non-attribution to an identified or identifiable subscriber.

The public key cryptography solutions provide mechanisms to minimize the number of public key cryptography operations wherein UE 102 uses a public key to securely carry its subscription identity over the air. Some solutions route the encrypted data, e.g., the IMSI, directly to HSS/UDM 108, which then provides the authentication vector back to the MME/AMF 106. Other solutions only provide the encrypted identity to the serving network. It is to be appreciated, however, that embodiments are not limited to these security solutions.

In both types of solutions, the identity of the subscriber that is visible to the radio interface 103 changes. That is, in pseudonym solutions, it is always a new pseudonym used when attaching to the network, while in public key cryptography solutions, the presentation of the encrypted identity will always be different by including randomness. It must be assured that UE 102 and HSS/UDM 108 are always synchronized. In a pseudonym solution, this means using the same pseudonym in order to point to the correct IMSI. In public key cryptography solutions, no failure is allowed in encryption. Also, the private key needs to always be available. Thus, both types of solutions bare the risk that recovery to a common state is needed at both ends of the communication. Only then can authentication and key agreement procedures be properly executed. Otherwise an out-of-sync situation can occur from which UE 102 and the network (e.g., MME/AMF 106) would need to recover, e.g. by requesting the identity of the user again after getting a failure message by HSS/UDM 108 in response of its request for authentication vectors.

There are several reasons for out-of-sync conditions to occur for a pseudonym solution including, by way of example (and as described in 3GPP TR 33.899):

1) lost pseudonym, already assigned pseudonym or invalid pseudonym: examples are that UE 102 incorrectly stored the pseudonym due to a hardware or a software glitch or HSS 108 lost the pseudonym due to hardware or software failure.

2) collision: for example, two UEs (102 and another UE accessing the system) were assigned the same pseudonym.

If the UE identity is hidden by using a public key cryptography solution, the out-of-sync condition is usually not a problem, since the identity does not change. Only the representation of the encrypted identity will change by using a different random part in the encryption. However, a recovery situation may occur if:

1) the network does not recognize the identity after decryption: for example, the network lost the private key or a mistake in decryption has occurred.

2) UE 102 used the wrong identity: thus, the network cannot map UE 102 to the correct IMSI.

In the above and other scenarios, the network (e.g., MME/AMF 106) repeatedly requests UE 102 to identify itself, even though UE 102 has previously provided its identity (either as a pseudonym or an encrypted identity). As reported in TR 33.899, such repeated identity request operations can occur for several reasons including, but not limited to:

1) as described above by failure, e.g., HSS/UDM 108 cannot map the received information to the IMSI of the UE; or 2) an active attacker (malicious entity) is running denial of service (DoS) attacks or is attempting to compromise subscription privacy.

Thus, as explained above, both classes of solutions could experience synchronization failures or be exposed to similar situations where recovery is needed. However, both classes of solutions could also be used by an attacker for DoS attacks or attempts to steal the subscription identity, e.g., if in LTE the temporary identity cannot be solved, the serving network would request the IMSI. 5G security attempts to avoid this situation in order to protect the subscription identity over the air interface.

Given the above scenarios and problems, various embodiments address the issue of how many times a UE should provide its identity again, after its earlier response was answered by a failure message (and request for re-identification) from the network or when the UE is being maliciously used in a DoS or other malicious attack on the network. As will be further explained, embodiments further address the issues of when the UE should send its real permanent identity and/or when out-of-band mechanisms (e.g., UE-to-network communications methods that do not go over the air interface 103) should be used. An example of such a permanent identifier for a UE is the IMSI, although alternative permanent identifiers for a UE may exist and be used in alternative embodiments. Illustrative embodiments describe the identity request process from the perspective of UE 102 and the MME/AMF 106 (operatively coupled via the eNB/gNB 104). However, in alternative network configurations, other elements may be involved in the identity request process.

Figure 2:
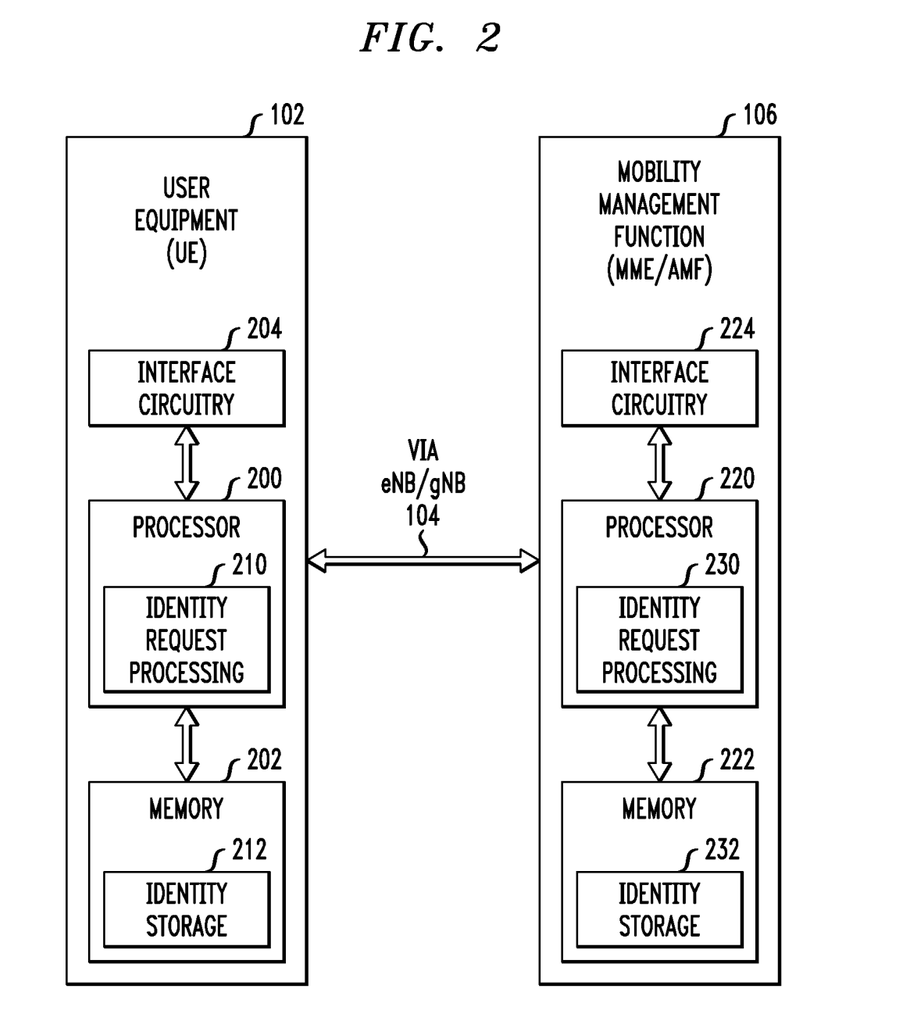
FIG. 2 shows a more detailed view of example user equipment and mobility management elements in an illustrative embodiment.

FIG. 2 shows a more detailed view of UE 102 and MME/AMF 106 in an illustrative embodiment. The UE 102 comprises a processor 200 coupled to a memory 202 and interface circuitry 204. The processor 200 of the UE 102 includes an identity request processing module 210 that may be implemented at least in part in the form of software executed by the processor. The identity request processing module 210 performs the user equipment operations of the processes described in conjunction with subsequent figures and otherwise herein. The memory 202 of the UE 102 includes an identity storage module 212 that stores the identity and related data generated or otherwise used during identity request operations with the MME/AMF 106 through the eNB/gNB 104.

The MME/AMF 106 comprises a processor 220 coupled to a memory 222 and interface circuitry 224. The processor 220 of the MME/AMF 106 includes an identity request processing module 230 that may be implemented at least in part in the form of software executed by the processor. The identity request processing module 230 performs the MME/AMF operations of the processes described in conjunction with subsequent figures and otherwise herein. The memory 222 of the MME/AMF 106 includes an identity storage module 232 that stores identity and related data generated or otherwise used during identity request operations with the UE 102 through the eNB/gNB 104.

The processors 200 and 220 of the respective UE 102 and MME/AMF 106 may comprise, for example, microprocessors, application-specific integrated circuits (ASICs), digital signal processors (DSPs) or other types of processing devices, as well as portions or combinations of such elements.

The memories 202 and 222 of the respective UE 102 and MME/AMF 106 may be used to store one or more software programs that are executed by the respective processors 200 and 220 to implement at least a portion of the functionality described herein. For example, identity request operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective UE 102 and MME/AMF 106 illustratively comprise transceivers or other communication hardware or firmware that allows the associated system elements to communicate with one another in the manner described herein.

It is apparent from FIG. 2 that UE 102 is configured for communication with MME/AMF 106 and vice-versa via their respective interface circuitries 204 and 224. The UE 102 communicates with the MME/AMF 106 via eNB/gNB 104. This communication involves UE 102 sending data to the MME/AMF 106 via eNB/gNB 104 and the MME/AMF 106 sending data to the UE 102 via eNB/gNB 104. However, in alternative embodiments, other network elements may be operatively coupled between the UE and MME/AMF. The term "data" as used herein is intended to be construed broadly, so as to encompass any type of information that may be sent between user equipment and a core network via a base station element including, but not limited to, identity data, control data, audio, video, multimedia, etc.

It is to be appreciated that the particular arrangement of components shown in FIG. 2 is an example only, and numerous alternative configurations may be used in other embodiments. For example, the user equipment and mobility management function can be configured to incorporate additional or alternative components and to support other communication protocols.

Other system elements, such as eNB/gNB 104, HSS 108, SGW/SMF 110, and PGW 112, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB/gNB and an associated radio network control function.

Figure 3A:
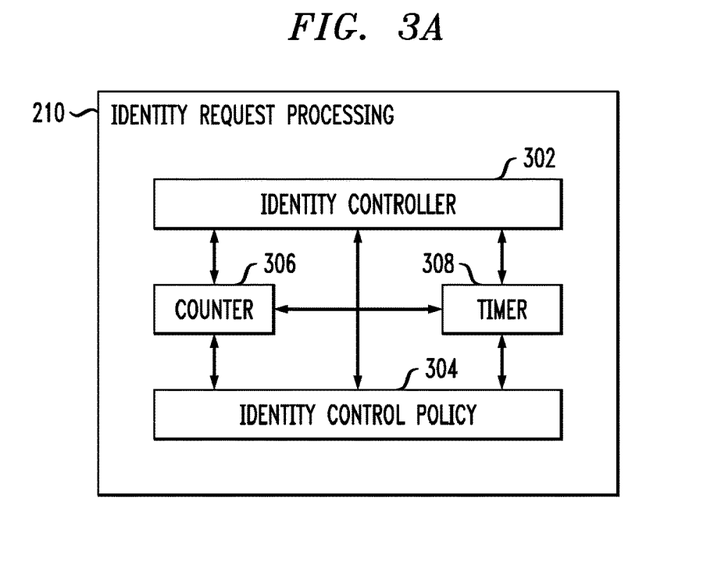
FIG. 3A shows a more detailed view of user equipment components for protecting the privacy of user equipment during identity request operations in an illustrative embodiment.

FIG. 3A shows a more detailed view of UE 102 components for providing user equipment decision control during identity request operations in an illustrative embodiment. The term "identity request operation" illustratively refers to any one or more steps, processes, protocols, or message exchanges whereby the identity of the UE is requested. This could be due to any of the one or more reasons mentioned above (e.g., error, glitch, failure, DoS attack, etc.), or for some other reason not expressly mentioned.

More particularly, FIG. 3A illustrates a detailed view of identity request processing module 210. As shown, in this illustrative embodiment, identity request processing module 210 comprises an identity controller 302, an identity control policy 304, a counter 306, and a timer 308, operatively coupled to one another.

In order to overcome the above and other problems associated with a UE being asked to respond to an identity request, identity controller 302 is configured to decide how often to respond to an identity request. In one or more embodiments, identity controller 302 makes the decision based on identity control policy 304, counter 306, and/or timer 308, as will be further explained below.

For example, based on policy 304 (which can be set by a network operator or the subscriber) and data from counter 306 and/or timer 308, identity controller 302 either provides its identity (using pseudonym solution, public key cryptography solution, or some other method) in response to a request or it does not respond as requested.

In one embodiment, counter 306 is configured to maintain a count of the number of requests of the subscriber's (UE) identity. Upon receipt of each identity request, identity controller 302 obtains the current count from counter 306. Then, based on policy 304 which specifies a permissible number of identity requests for the UE 102 to respond to, identity controller 302 compares the current count from counter 306 to the permissible number of requests from policy 304. If the current count is below the permissible number set by the policy 304, then identity controller 302 provides its identity as requested. However, if the current count is at or above the permissible number, then identity controller 302 does not provide its identity in the manner requested. For example, the identity controller 302 may ignore the identity request and withhold its identity, or the identity controller 302 may respond to the request through an out-of-band mechanism (e.g., not over the air interface 103).

Advantageously, the count information and the permissible number set by the policy 304 are used by UE 102 to decide whether to continue responding to the same request several times or whether to use out-of-band mechanisms. In the case of the pseudonym solution, UE 102 would run out of pseudonyms otherwise. In the case of the public key cryptography solution, UE 102 could otherwise be an unwitting victim of a DoS attack. In either case, the policy 304 provides the appropriate permissible number of requests to which UE 102 will respond. It is understood that a UE shall never respond with its real identity (IMSI) in a request for its identity.

Still further, in an illustrative embodiment, timer 308 is configured to reset counter 306 and thus restart the counting of identity requests. For example, the identity control policy 304 specifies when timer 308 resets counter 306. For example, the policy 304 may specify that every time the UE 102 successfully attaches to the network, counter 306 is reset. Still further, counter 306 and timer 308, in some embodiments, maintain a time interval parameter that indicates to the identity controller 302 how often during a given period of time UE 102 was requested to identify. In this case, the identity controller 302 is instructed through the policy module 304 to only respond to a given number identity requests within a given time window.

Figure 3B:
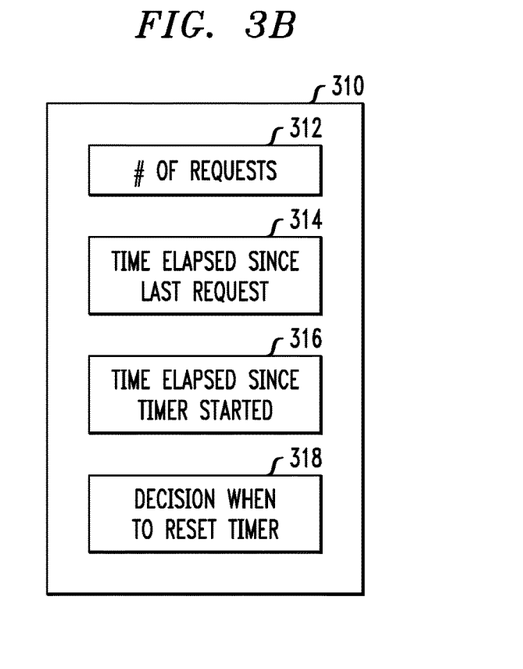
FIG. 3B shows a set of identity control policy fields in an illustrative embodiment.

FIG. 3B shows a set of identity control policy fields 310 in an illustrative embodiment. In one or more other embodiments, the set of identity control policy fields 310 is maintained as part of the UICC (or any other non-manipulatable storage area) or part of the ME of UE 102. The set of identity control policy fields 310 can be part of the identity control policy 304. In illustrative embodiments, such a set of fields 310 has entries including, but not limited to: # of requests (312); time elapsed since last request (314); time elapsed since timer started (316); and decision when to reset a timer (318). More or less entries can be part of the policy Advantageously, using one or more embodiments as described herein, DoS or other privacy compromise attacks can be recognized by the UE and prevented thus protecting the privacy of the UE.

Figure 4:
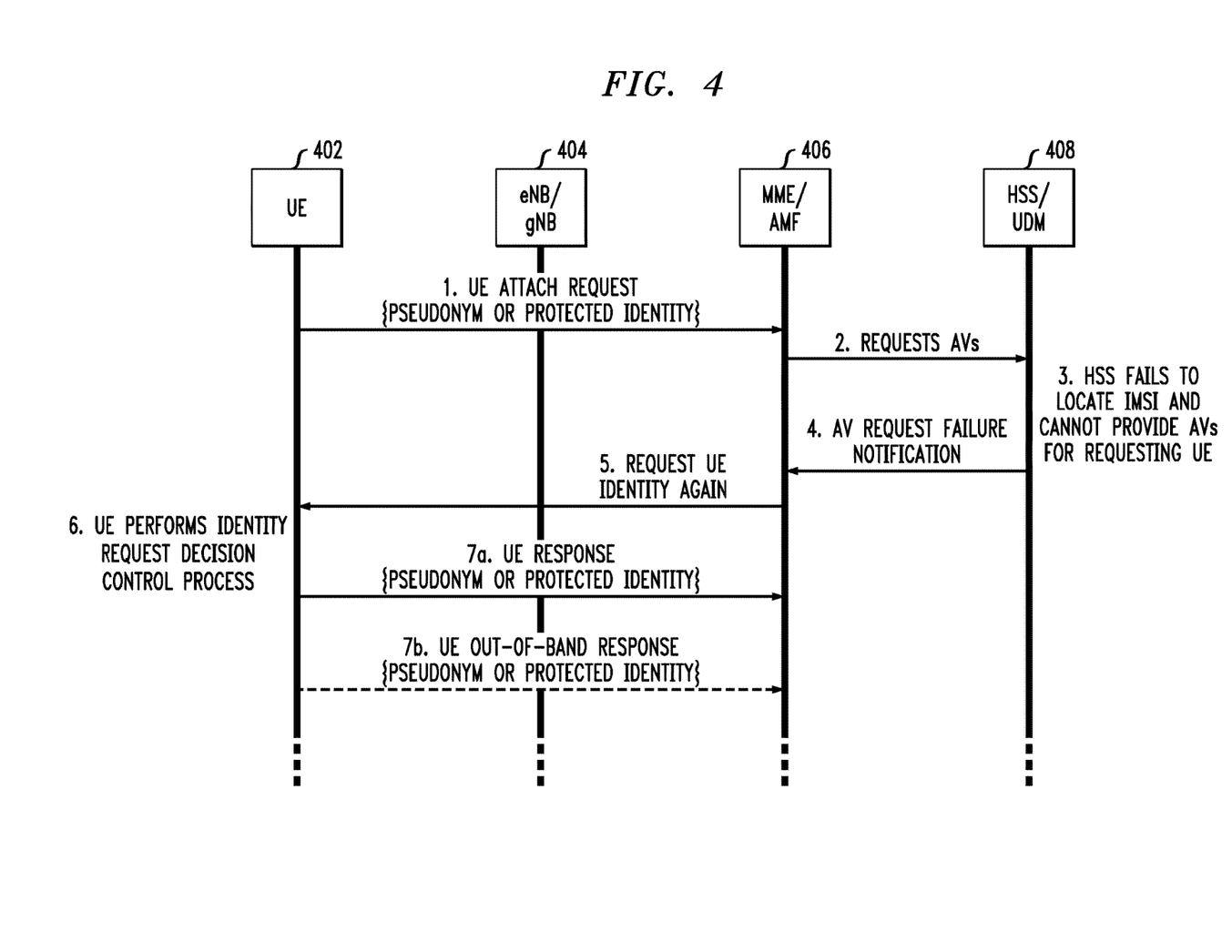
FIG. 4 shows a message flow for identity request operations in an illustrative embodiment.

An illustrative embodiment is described in FIG. 4. More particularly, FIG. 4 shows a message flow for an identity request process for user equipment. It is to be appreciated that the system elements shown in FIG. 4 (UE, eNB/gNB, MME/AMF, HSS/UDM) correspond to similarly labeled system elements in FIGS. 1, 2 and 3. The numbered steps below correspond to the numbers of the message flow in FIG. 4.

1. UE 402 sends an attach request through eNB/gNB 404 to MME/AMF 406. As explained above, the attach request includes either a pseudonym of UE 402 (pseudonym solution) or a protected identity of UE 402 (public key cryptography solution).

2. In response, the MME 406 (or SEAF as part of AMF in 5G) requests authentication vectors (AVs) corresponding to UE 402 from HSS 408 (or AUSF/ARPF as part of UDM in 5G) in order to authenticate UE 402.

3. It is assumed, in this illustrative embodiment, that HSS/UDM 408 fails to locate the IMSI and therefore cannot provide the AVs that correspond to the pseudonym or protected identity provided by UE 402 in step 1. Failure could be caused for any reason, by way of example, one or more of the reasons given above.

4. HSS/UDM 408 replies to MME/AMF 406 with an appropriate AV request failure notification.

5. MME/AMF 406 then requests UE 402 to provide its identity again.

6. In response to the identity request, UE 402 performs an identity request decision control process as described herein, e.g., using the policy/counter/timer approach described above in the context of FIGS. 3A and 3B.

7. Depending on the decision, UE 402 provides an appropriate response with its pseudonym or protected identity (i.e., in a manner requested by MME/AMF 406) in step 7a, or it does not provide its pseudonym or protected identity in a manner requested and either withholds it completely or provides it through an out-of-band mechanism (e.g., bypassing the air interface between UE 402 and eNB/gNB 404) to MME/AMF 406 in step 7b.

Figure 5:
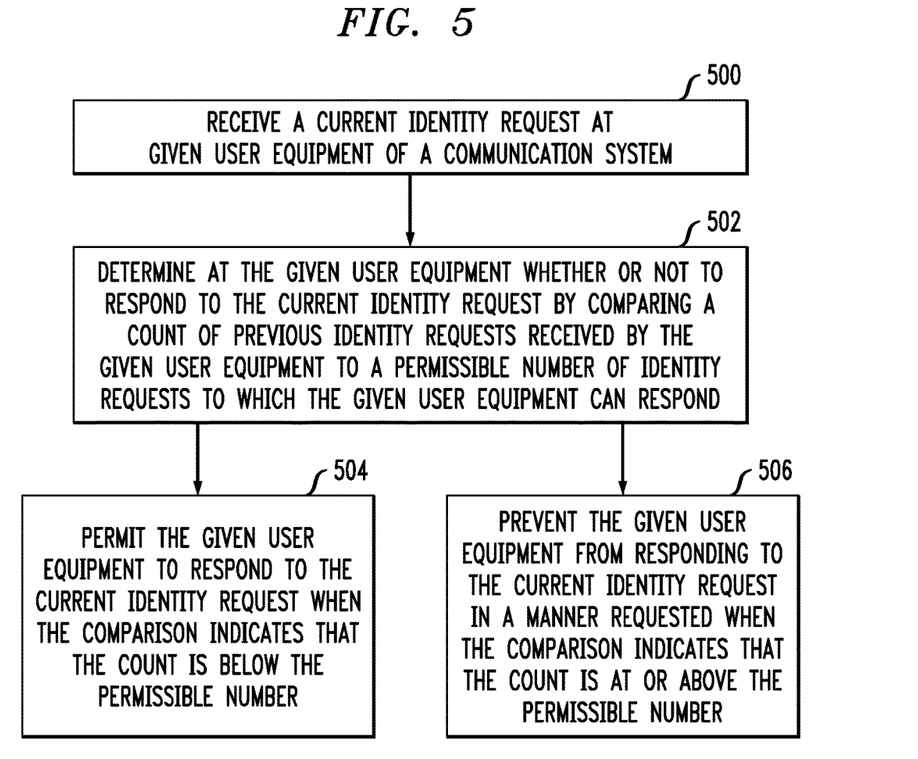
FIG. 5 shows a flow diagram of a user equipment identity request process in an illustrative embodiment.

FIG. 5 shows a flow diagram of a user equipment identity request process in an illustrative embodiment.

In step 500, a current identity request is received at given user equipment of a communication system.

In step 502, a determination is made at the given user equipment whether or not to respond to the current identity request in a manner requested (e.g., over air interface 103 between UE 102 and eNB/gNB 104) based on a count of previous identity requests received by the given user equipment. As explained above, in one or more embodiments, the determination comprises comparing the count of previous identity requests received by the given user equipment to a permissible number of identity requests to which the given user equipment can respond.

Then, in step 504, the given user equipment is permitted to respond to the current identity request when the comparison indicates that the count is below the permissible number.

Otherwise, in step 506, the given user equipment is prevented from responding to the current identity request in a manner requested when the comparison indicates that the count is at or above the permissible number.

In illustrative embodiments, the identity request operation comprises MME/AMF 106 or some other entity (e.g., DoS attacker) sending one or more identity request messages to the given user equipment (e.g., UE 102).

It is to be appreciated that the naming of identifiers mentioned herein, e.g., IMSI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein.

Also, embodiments may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

What is claimed is:

1. A method comprising:

sending an attach request from a given user equipment to a mobility management element of a communication system, the attach request comprising a protected identifier of the given user equipment, the protected identifier of the given user equipment comprising at least one of: a pseudonym of a subscription identifier of the given user equipment; and an encrypted version of the subscription identifier of the given user equipment;

receiving, at the given user equipment, a current identity request for the protected identifier of the given user equipment responsive to the mobility management element failing to locate the subscription identifier of the given user equipment using the protected identifier in at least one of the attach request and a response to a previous identity request; and determining at the given user equipment whether or not to respond to the current identity request in a manner requested based on a count of previous identity requests received by the given user equipment;

wherein the given user equipment comprises a processor and memory configured to execute the above steps;

wherein the determining step further comprises comparing the count of previous identity requests received by the given user equipment to a permissible number of identity requests to which the given user equipment can respond;

further comprising:

permitting the given user equipment to respond to the current identity request when the comparison indicates that the count is below the permissible number; and preventing the given user equipment from responding to the current identity request in a manner requested when the comparison indicates that the count is at or above the permissible number;

wherein the preventing step further comprises the given user equipment providing its identity in response to the current identity request by an out-of-band mechanism.

2. The method of claim 1, wherein the preventing step further comprises the given user equipment withholding its identity in response to the current identity request.

3. The method of claim 1, wherein determining step further comprises determining at the given user equipment whether or not to respond to the current identity request based on the count of previous identity requests received by the given user equipment within a given time period.

4. The method of claim 3, wherein the determining step further comprises maintaining a timer at the given user equipment to track the given time period.

5. The method of claim 1, wherein the determining step further comprises maintaining a counter at the given user equipment to track the count of previous identity requests received by the given user equipment.

6. The method of claim 5, wherein the determining step further comprises resetting the counter following occurrence of an event.

7. The method of claim 6, wherein the event comprises the given user equipment attaching to the communication system.

8. The method of claim 6, wherein the event comprises the expiration of a given time period.

9. The method of claim 1, wherein the given user equipment receives the current identity request from the mobility management element of the communication system.

10. The method of claim 1, wherein the given user equipment receives the current identity request from a malicious entity.

11. The method of claim 1, wherein the communication system comprises a 5G system.

12. An apparatus comprising:

given user equipment in a communication system configured to:

send an attach request from the given user equipment to a mobility management element of the communication system, the attach request comprising a protected identifier of the given user equipment, the protected identifier of the given user equipment comprising at least one of: a pseudonym of a subscription identifier of the given user equipment; and an encrypted version of the subscription identifier of the given user equipment;

receive, at the given user equipment, a current identity request for the protected identifier of the given user equipment responsive to the mobility management element failing to locate the subscription identifier of the given user equipment using the protected identifier in at least one of the attach request and a response to a previous identity request; and determine at the given user equipment whether or not to respond to the current identity request in a manner requested based on a count of previous identity requests received by the given user equipment;

wherein the given user equipment comprises a processor and memory configured to execute the above operations;

wherein the given user equipment is further configured to make the determination whether or not to respond by comparing the count of previous identity requests received by the given user equipment to a permissible number of identity requests to which the given user equipment can respond;

the given user equipment further configured to:

permit the given user equipment to respond to the current identity request when the comparison indicates that the count is below the permissible number; and prevent the given user equipment from responding to the current identity request in a manner requested when the comparison indicates that the count is at or above the permissible number;

wherein the given user equipment is further configured to prevent response in the manner requested by providing its identity in response to the current identity request by an out-of-band mechanism.

13. The apparatus of claim 12, wherein the given user equipment is further configured to prevent response in the manner requested by withholding its identity in response to the current identity request.

14. The apparatus of claim 12, wherein the given user equipment is further configured to determine whether or not to respond to the current identity request based on the count of previous identity requests received by the given user equipment within a given time period.

15. An article of manufacture comprising a non-transitory computer-readable storage medium having embodied therein executable program code that when executed by a processor causes the processor to:

send an attach request from a given user equipment to a mobility management element of a communication system, the attach request comprising a protected identifier of the given user equipment, the protected identifier of the given user equipment comprising at least one of: a pseudonym of a subscription identifier of the given user equipment; and an encrypted version of the subscription identifier of the given user equipment;

receive, at the given user equipment, a current identity request for the protected identifier of the given user equipment responsive to the mobility management element failing to locate the subscription identifier of the given user equipment using the protected identifier in at least one of the attach request and a response to a previous identity request; and determine at the given user equipment whether or not to respond to the current identity request in a manner requested based on a count of previous identity requests received by the given user equipment;

wherein the determining further comprises comparing the count of previous identity requests received by the given user equipment to a permissible number of identity requests to which the given user equipment can respond;

the executable program code when executed further causes the processor to:

permit the given user equipment to respond to the current identity request when the comparison indicates that the count is below the permissible number; and prevent the given user equipment from responding to the current identity request in a manner requested when the comparison indicates that the count is at or above the permissible number;

wherein the preventing further comprises the given user equipment providing its identity in response to the current identity request by an out-of-band mechanism.

16. The apparatus of claim 12, wherein the given user equipment is further configured to make the determination whether or not to respond by maintaining a counter at the given user equipment to track the count of previous identity requests received by the given user equipment.

17. The apparatus of claim 16, wherein the given user equipment is further configured to reset the counter following occurrence of an event.

18. The apparatus of claim 17, wherein the event comprises at least one of:

the given user equipment attaching to the communication system; and the expiration of a given time period.

19. The article of manufacture of claim 15, wherein the executable program code when executed further causes the processor to make the determination whether or not to respond by maintaining a counter at the given user equipment to track the count of previous identity requests received by the given user equipment.

20. The article of manufacture of claim 19, wherein the executable program code when executed further causes the processor to reset the counter following occurrence of an event.

* * * * *